United States Patent

Ames

(10) Patent No.: US 9,001,123 B1
(45) Date of Patent: Apr. 7, 2015

(54) FORMING A POLYGON MESH WITHOUT SHIFTING VERTEX POSITIONS

(71) Applicant: Lockheed Martin Corporation, Bethesda, MD (US)

(72) Inventor: Brian Michael Ames, Mogadore, OH (US)

(73) Assignee: Lockheed Martin Corporation, Bethesda, MD (US)

(*) Notice: Subject to any disclaimer, the term of this patent is extended or adjusted under 35 U.S.C. 154(b) by 344 days.

(21) Appl. No.: 13/669,644

(22) Filed: Nov. 6, 2012

Related U.S. Application Data (60) Provisional application No. 61/672,640, filed on Jul. 17, 2012.

(51) Int. Cl.
  *G06T 15/30* (2011.01)
  *G06T 15/20* (2011.01)
(52) U.S. Cl.
  CPC .................................. *G06T 15/205* (2013.01)
(58) Field of Classification Search
  CPC ......... G06T 17/20; G06T 9/001; G06T 17/10; G06T 17/205; G06F 17/50
  USPC ........................................ 345/419, 420, 423
  See application file for complete search history.

(56) References Cited

U.S. PATENT DOCUMENTS

| | | | |
|---|---|---|---|
| 6,201,542 B1 * | 3/2001 | Arai et al. ..................... | 345/419 |
| 6,208,347 B1 * | 3/2001 | Migdal et al. ................. | 345/419 |
| 6,396,490 B1 * | 5/2002 | Gorman ........................ | 345/419 |
| 6,765,574 B1 * | 7/2004 | Mao et al. ..................... | 345/428 |
| 6,933,940 B2 * | 8/2005 | Junkins et al. ................. | 345/427 |
| 7,138,999 B2 * | 11/2006 | Alliez et al. .................. | 345/423 |
| 8,223,146 B2 * | 7/2012 | Kotake et al. ................. | 345/420 |
| 8,228,329 B2 * | 7/2012 | Maekawa et al. ............. | 345/423 |
| 8,384,717 B2 * | 2/2013 | Huang et al. .................. | 345/441 |
| 2002/0003539 A1 * | 1/2002 | Abe ............................... | 345/428 |
| 2005/0012742 A1 * | 1/2005 | Royan ........................... | 345/419 |
| 2014/0098090 A1 * | 4/2014 | Schmidt et al. ............... | 345/419 |

\* cited by examiner

*Primary Examiner* — Hau Nguyen
*Assistant Examiner* — Ryan M Gray
(74) *Attorney, Agent, or Firm* — Terry M. Sanks, Esq.; Beusse Wolter Sanks & Maire, P.A.

(57) ABSTRACT

A polygon mesh may have a plurality of vertices and a set of polygon faces. Each of the triangles defining candidate planes may include one of the vertices as an endpoint of each line segment. For each of the candidate planes, an area or a number of vertices, referred to as a point count, may be computed. The candidate planes may be ordered by decreasing area or by decreasing point count. A planar face may be selected in accordance with the ordering. The selected planar face may be added to a set of polygon faces for a modified polygon mesh. Non-selected ones of the candidate planes may be excluded, whenever the non-selected candidate plane overlaps in area with an already selected planar polygon face. The selecting and the excluding may be repeated until the modified polygon mesh is formed. The modified polygon mesh may be a tessellation in three dimensions.

20 Claims, 4 Drawing Sheets

Tables 340

Vertex Table 346
Polygon Table 344
Possible Plane Table 342

| Polygon | Points | PtCt |
|---|---|---|
| Poly A | P1, P4, P6, P8, P12, P17 | 6 |
| Poly B | P1, P4, P6, P8, P21 | 5 |
| Poly C | P8, P12, P21, P22 | 4 |
| Poly D | P12, P17, P21, P30 | 4 |
| Poly Q | P12, P17, P30 | 3 |

FORMING A POLYGON MESH WITHOUT SHIFTING VERTEX POSITIONS

CROSS-REFERENCE TO RELATED APPLICATIONS

This application claims the benefit of U.S. Provisional Application No. 61/672,640 filed Jun. 17, 2012, and incorporated herein by reference in its entirety.

BACKGROUND

The present disclosure relates to the field of graphical modeling, and more specifically, to polygon meshes.

A polygon mesh is a three dimensional (3D) object composed of one or more polygons. The polygon mesh can share edges to form a 3D patchwork. Polygonal meshes are extensively used in computer graphics and geometric modeling applications. A variety of operations performed on polygon meshes can include Boolean logic, smoothing, simplification, and the like. Operations performed on polygon meshes can include polygon reduction operations.

Polygon reduction lightens an otherwise heavy computing burden associated with representing and manipulating a polygon mesh by reducing a number of polygons in the polygon mesh, while still retaining a useful fidelity to the shape of the original high-resolution version of the 3D geometric solid. Polygon reduction permits several versions of a 3D object to be generated at different levels of detail (LOD). Polygon reduction may substitute n-gons in a polygon mesh with other n-gons having a greater number of vertices. Thus, multiple three vertices n-gons (triangles) may be replaced with a lower number of n-gons having four vertices (quadrilaterals).

Problems may result when performing polygon reduction (and other graphic modeling operations) on polygon meshes having one or more non-planar polygons. One technique for handling non-planar polygons involves vertex adjustments, where vertices of polygons in a polygon mesh are adjusted to maintain a strong match (high or acceptable resolution) with the 3D object being represented, where the adjustments minimizes a quantity of polygons needed in the polygon mesh. Adjustment to positions of vertices in a polygon mesh can result in distortions, where edges of polygons of the polygon mesh imperfectly match. That is, "cracks" appear in the polygon mesh.

Further techniques and algorithms that re-position vertices of a polygon mesh can have somewhat unpredictable results, which vary depending on which point is selected as a starting point (e.g., starting point of a vertex table) of an algorithm that re-positions vertices. This unpredictable behavior can lead to increasing distortions as the polygon mesh is repetitively processed (and altered) by vertices shifting algorithms. In other words, distortions in the polygon mesh continuously increase as the polygon mesh is continuously manipulated.

BRIEF SUMMARY

The disclosure creates polygon meshes approximating a 3D object containing at least one non-planar polygon without shifting vertices. Embodiments of the disclosure include determining a plurality of possible planes for a polygon mesh. The polygon mesh may have a plurality of vertices and a set of polygon faces. Each of the possible planes may include one of the vertices as an endpoint of each line segment. For each of the possible planes, an area or a number of vertices (referred to as a point count) may be computed. The possible planes may be ordered by decreasing area or by decreasing point count. A planar face may be selected in accordance with the ordering. The selected planar face may be added to a set of polygon faces for a modified polygon mesh. Non-selected ones of the possible planes may be excluded, whenever the non-selected possible plane overlaps in area with an already selected planar polygon face. The selecting and the excluding may be repeated until the modified polygon mesh is formed. The modified polygon mesh may be a tessellation in three dimensions. The modified polygon mesh may have the same vertices as the unmodified polygon mesh. A different set of polygon faces may exist for the modified polygon mesh.

An embodiment of the disclosure is for a system, method, computer program product, and/or apparatus for graphic modeling. In the embodiment, a set of points that are vertices of an initial polygon mesh may be determined. A plurality of possible planes may be generated such that each vertex of each of the possible planes is one of the set of points. The possible planes may be ordered by decreasing area. Possible planes may be selected as polygon faces in accordance with the ordering from greatest to least area. A three-dimensional tessellation may be created that includes the selected polygon faces. The three-dimensional tessellation may be a polyhedron shape referred to as a modified polygon mesh.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
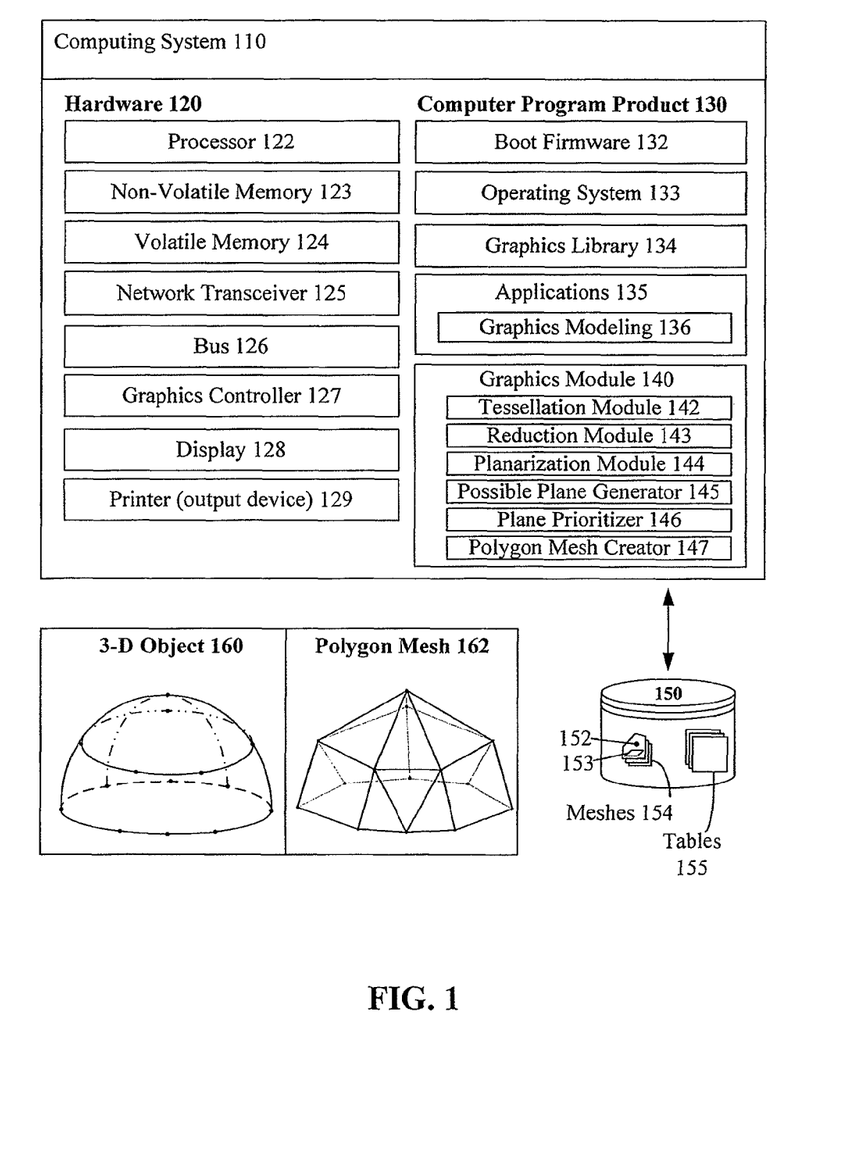
FIG. 1 shows a computing system for polygon meshes in accordance with an embodiment of the disclosure.

FIG. 1 shows a computing system 110 for polygon meshes in accordance with an embodiment. The computer system 110 includes hardware 120 and computer program products 130 that together create, store, and/or manipulates a polygon mesh 162. The techniques and algorithms detailed herein permit creation and/or manipulation of a polygon mesh 162 without shifting or repositioning any of the end-points of the vertices. Thus, problems with edge-mismatching or process induced distortions may be decreased or eliminated.

As used herein, a polygon mesh 162 is a collection of vertices, edges and faces that define a shape of a 3-D object 160 in 3D computer graphics and solid modeling. Different representations of polygon meshes 162 are used for different applications and goals. The variety of operations performed on polygon meshes 162 may include Boolean logic, smoothing, simplification, and many others. Network representations, "streaming" and "progressive" meshes, for example, are used to transmit polygon meshes 162 over a network. Volumetric meshes are to be considered distinct from polygon meshes 162 in that they explicitly represent both the surface and volume of a structure, while polygon meshes 162 only explicitly represent the surface. Hence, for polygon meshes 162, volume is implicit.

The faces of the polygon mesh 162 typically consist of triangles, quadrilaterals, and other simple convex polygons. Use of these simple polygons, especially planar ones, simplifies in rendering operations and of linear algebra manipulations of the polygon mesh 162. A polygon mesh 162 can include concave polygons, polygons with holes, non-planar polygons of varying types, and the like.

A polygon of N vertices may define as many as $(N)(N-1)(N-2)/6$ distinct planes, each defined by groups of three adjacent and non-collinear vertices with the three vertices forming a triangle. When all the polygon's vertices lie in the same plane, the polygon is planar and all the planes defined by the groups of three adjacent vertices are coincident. When they do not all lie in the same plane, the polygon is non-planar and the form of the surface bounded by the segments is indeterminate. As a non-limiting example, a non-planar polygon having 4 vertices defines 4 non-coincident planes, either of two pairs of non-coincident planes being candidates for reduction of the polygon to triangles. These 4 planes bind a volume of space that cannot be determined to lie to either one side or the other of the polygon.

For embodiments in three-dimensions, the polygon mesh 162 may define a shape of a polyhedral object, which makes a polyhedron a special case of a polygon mesh 162, as used herein. A polyhedron is a geometric solid in three dimensions with flat faces and straight edges. A polyhedron may be made up of a finite number of polygon faces which are parts of planes. The faces may meet in pairs along edges, which may be referred to as straight-line segments. The edges can meet in points called vertices. The polyhedron surrounds a bounded volume in three-dimensional space. A polyhedron is said to be convex if its surface (comprising its faces, edges and vertices) does not intersect itself and the line segment joining any two points of the polyhedron is contained in the interior or surface. Appreciably, the polygon mesh 162 and techniques used herein may be related to a geometric construct, as defined herein. Alternatively, the polygon mesh 162 may be a purely algebraic or abstract construct, which is definable within hardware 120 and software 130 using a variety of mathematic principles and manipulation techniques known in the art.

As mentioned, a polyhedron is a special case for a polygon mesh 162. A polygon mesh 162 may also be considered an unstructured or irregular grid of any number of dimensions. The techniques and innovations expressed herein may be applicable to four-dimensional irregular grids, five-dimensional irregular grids, and higher order dimensions (n-dimensions, where N is an integer three or greater). To elaborate, an irregular grid may be considered a tessellation of a part of the Euclidean plane or Euclidean space by simple shapes. The tessellation may occur in an irregular pattern.

A tessellation refers to a pattern of planar polygon faces that fills a multi-dimensional space with no overlaps and no gaps.

Figure 2:
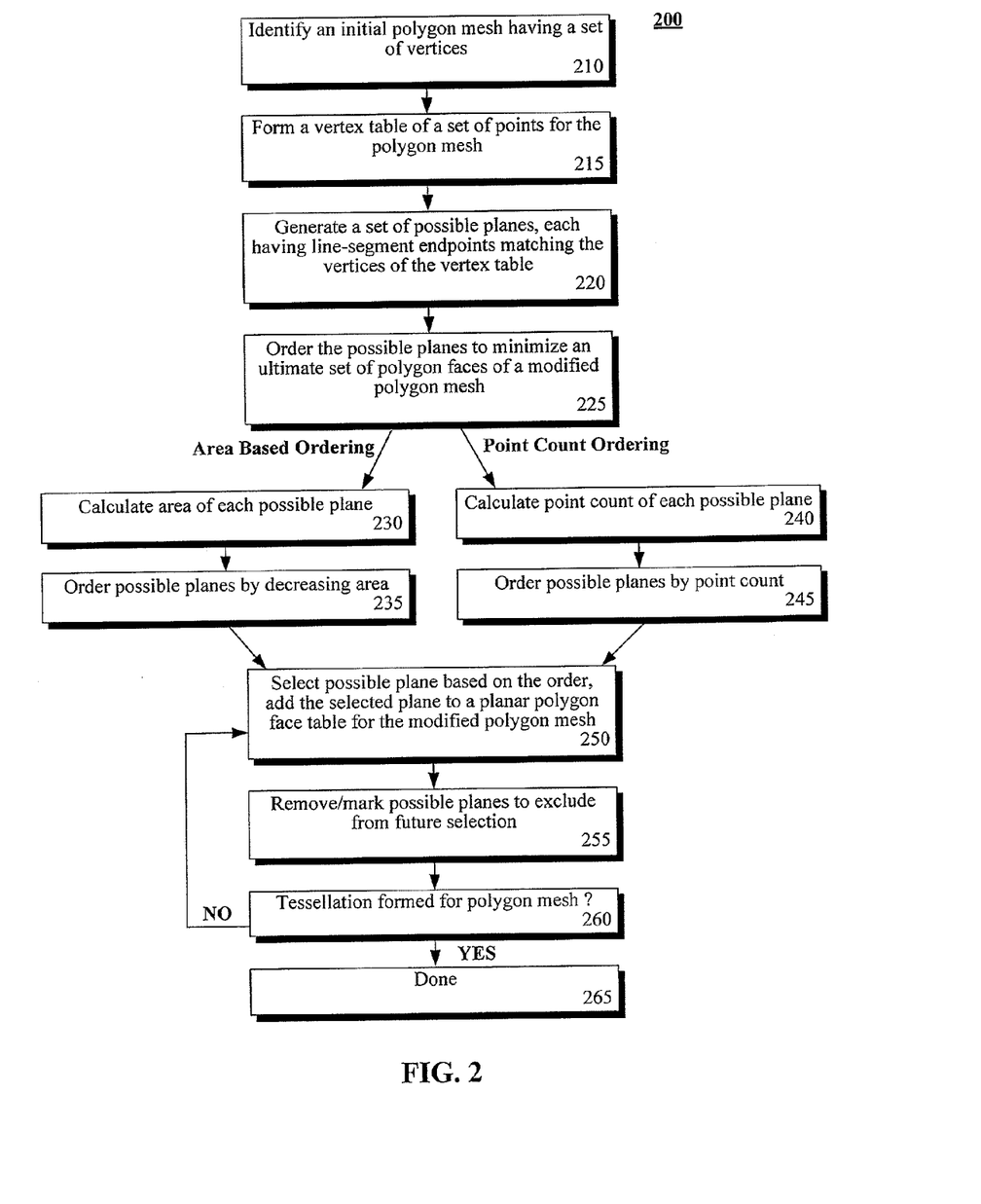
FIG. 2 is a flowchart of a method for constructing a polygon mesh in accordance with an embodiment of the disclosure.

Having defined a polygon mesh 162 and turning to FIG. 2, a method 200 for constructing a polygon mesh 162 is provided. Method 200 can begin in step 210, where an initial polygon mesh is identified. The initial polygon mesh may have a defined set of vertices, and polygon faces. The polygon faces of the initial polygon mesh may include planar faces, non-planar polygon faces, and combinations thereof. In step 215, a vertex table may be formed that includes a set of points, one for each of the vertices of the initial polygon mesh.

In step 220, a set of triangles defining the candidate planes may be created and placed in a table. Each vertex of each triangle may be a member of the set of points described by the vertex table. The planes thus defined need not be distinct and the set triangles defining the same plane may or may not overlap.

In step 225, the candidate planes may be ordered relative to each other. This ordering may be one designed to minimize an ultimate set of polygon faces present in a modified polygon mesh. For example, in one embodiment, the candidate planes may be ordered by signed area. Thus, an area of each candidate planes may be calculated, as shown by step 230. In step 235, the candidate planes may be ordered by decreasing signed area.

In another embodiment, the ordering of the triangles defining the candidate planes may be based on the summation of the count of line segments incident to the points contained in the candidate plane where the line segment itself does not lie in the candidate plane. For instance, a quantity of these incident line segments for each of the candidate planes may be calculated, as indicated by step 240. Calculating these incident line segments may be referred to as counting a number of points in the respective candidate plane, as each line segment in the plane is made up of exactly two points. In step 245, the set of triangles defining the candidate planes may be ordered by decreasing incident line segment count (or point count of points in the candidate plane, in one embodiment. That is, the fewer line segments in a candidate plane, the fewer points. It should be understood that for a candidate plane a number of line segments in that plane equals the number of points for that candidate plane minus one).

The method of ordering planes in step 225 is not to be construed as limited to ordering by area (steps 230-235) or by point-count (steps 240-245) (alternatively by line count with is effectively equivalent to point-count as described herein). Instead, the method 200 (and the disclosure in general) includes any of a variety of ordering techniques for the candidate planes. For example, in one embodiment, candidate planes may be pre-filtered to ensure a set of constraints on the modified polygon mesh are satisfied.

For example, only those planes having an orthogonal distance (from the plane center) to the outer surface of a 3-D object (being approximated by the polygon mesh) within defined constraints can be considered. Other candidate planes may be discarded. In other words, a "matching" of plane to surface of a solid object can be within a certain tolerance, else that candidate plane is discarded as a candidate. The illustrated constraint may ensure that the outer surface of the polygon mesh remains true to the 3-D object 160. Other constraints, filters, and the like may be established to bias the order and/or selection of the candidate planes from the candidate plane table.

Regardless of specific ordering details, in step 250 a candidate plane may be selected based on the order (e.g., a topmost plane in the order can be selected). This candidate plane may be added to a planar polygon face table. This planar polygon face table may be a table for planar polygon faces established for a modified polygon mesh.

In one embodiment, the modified polygon mesh may include the same vertices as the initial polygon mesh, yet may have different polygon planes. In other words, positions of the vertices have not been shifted (e.g., have not been moved in Euclidean space relative to each other), yet the polygon faces have been changed.

In step 255, candidate planes of the candidate plane table may be removed or marked to exclude from future selection those candidate planes that overlap with a set of polygon faces in the planar polygon face table. That is, the candidate plane table may be reduced or filtered so that only "non-overlapping" planes for constructing the modified polygon mesh remain. In step 260, a check to see if a tessellation has been formed for the modified polygon mesh by the polygon faces in the planar polygon face table may be made. Stated differently, step 260 may determine if all of the polygon faces in the planar polygon face table share each of their edges with another of the polygon faces. If not, additional polygon faces need to be added. Thus, if no tessellation is formed, the method may proceed from step 260 to step 250. When a tessellation is formed for the polygon mesh, the method may end in step 265.

It should be emphasized that the initial polygon mesh and the modified polygon mesh need not have the exact same number of vertices. That is, one or more of the vertices of the initial polygon mesh may be deleted, which will reduce the fidelity of the modified polygon mesh relative to the initial polygon mesh. Similarly, one or more of the vertices may be added to the modified polygon mesh, which are not present in the initial polygon mesh where needed to close cracks and to simplify the triangulation of convex polygons. Vertices may be added/removed between steps 210 and 215, so that the candidate plane table is generated for the appropriate vertices. Even when vertices are added/removed between the initial polygon mesh and the modified polygon mesh, those vertices that are in-common are positioned in exactly the same relative positions.

Turning back to FIG. 1, the computer system 110 represents one candidate system for carrying out the steps of method 200. The computer system 110 may include one or more computing devices. The computing devices may be general purpose computing devices, such as personal computers, servers, in-vehicle computers, and the like. In various embodiments, computing device(s) may be implemented as stand-alone devices, as virtual devices, as distributed devices, as cooperative devices, and the like.

The hardware 120 may comprise at least one processor 122, a non-volatile memory 123, a volatile memory 124, a network transceiver 125, a bus 126, a graphics controller 127, a display 128, a printer 129, a data store 150, and/or other such components. Data store 150 may store polygon mesh data 154, which includes vertices 152 and polygon faces 153 of each stored polygon mesh 154. Data store 150 may also store a set of tables 155, such as one or more candidate plane tables, one or more polygon mesh tables, one or more vertex tables, and the like.

The computer program products 130 may include programmatic instructions that are digitally encoded in a memory or storage device and are able to be executed by the one or more processors 122. Computer program products 130 may include boot firmware 132, (e.g., basic input/output system (BIOS)), an optional operating system 133, graphics library 134, and applications 135. One of the applications 135 may be a graphics modeling application 136. A graphics module 140 may represent a functional module for performing a graphics modeling operation. Modules 140 may be part of one or more of the applications 135 and/or may be functionality presented from a remotely executing code (such as functionality provided as Web service).

The graphics library 134 may represent an application program interface (API) for computer graphics and/or computer modeling. The library 134 may be one supported by the graphics controller 127. One or more of the modules 140 may be explicitly designed to function with the graphic library 134. In one embodiment, functionality expressed within one or more of the graphics modules 140 may be implemented within code of the graphics library 134. Examples of the graphics library 134 include, but are not limited to, the OpenGL™ library, Direct3D™ library, and the DirectX™ library.

The graphics modeling 136 application may be any application able to create, edit, or render graphical objects in two or more dimensions. The graphics modeling applications 136 may include dedicated programs (e.g., Presagis Creator™, form*Z™, Maya™, 3DS Max™, Blender™, Lightwave™, Modo™, solidThinking™) or an application component (Shaper™, Lofter™ in 3DSMax) or some scene description language (e.g., POV-Ray™). The polygon mesh creation or editing detailed herein (e.g., method 200) may be implemented by any graphics modeling application 136, such as the above example programs.

The modules 140 may include a tessellation module 142 that tiles planar polygon faces in two or more dimensions to create a tessellation. Many tessellation implementations, which may be the situation with tessellation module 142, generate a set of triangles, which are joined. Reduction operations may be necessary to reduce the number of polygon faces, after an initial triangle-based tessellation is generated.

Reduction module 143 may be configured to perform reduction operations. In one embodiment, different levels of detail (LODs) constraints may be established for the reduction module 143, which permits variations of representation of a single 3-D object as different polygon meshes.

Planarization module 144 may be configured to take a non-planar N-dimensional object and convert it into a planar representation. In one embodiment, an initial polygon mesh may include one or more non-planar polygon faces, which are converted (by planarization module 144) into a polygon mesh consisting solely of planar polygon faces (in accordance with method 200 details, for example).

The candidate (possible) plane generator 145 is a code module, which when executed creates a set of planes. Each of these planes may have end-points matching a defined set of end-points. Further, each of the candidate planes may be a planar polynomial face of a polygon mesh. The candidate polygons created by generator 145 may be overlapping. That is, not all of the candidate planes are able to be used as faces for the same polygon mesh.

The plane prioritizer 146 orders or prioritizes a set of candidate planes created by generator 145. The ordering may be based on an area of each plane, on a point count of each plane, and on other definable factors.

The polygon mesh creator 147 configured to create a polygon mesh from planes of the generator 145 in accordance with an order established by prioritizer 146.

Referring to FIGS. 3A-3F, a non-limiting, illustrative use case is shown for generating polygon meshes consisting of planar polygon faces in accordance with embodiments of the disclosure. The use case may be implemented by a computing system 110 and/or can perform the functions of method 200.

Figure 3A:
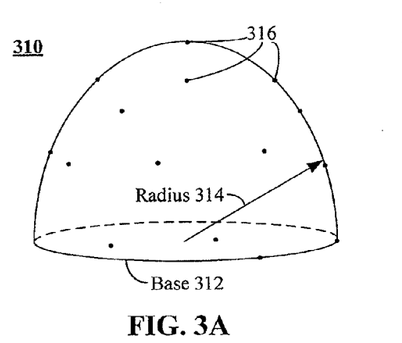
FIGS. 3A-3F show a use case for generating polygon meshes consisting of planar polygon faces in accordance with an embodiment of the disclosure.
Figure 3B:
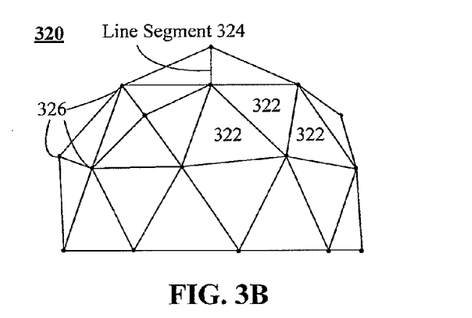

As shown in FIG. 3A, a three-dimensional (3D) object 310 is approximated with a polygon mesh 320 that has a convex polyhedron shape. The 3D object 310 of the use-case is a half-sphere having a planar circular base 312 with a radius 314. The remaining surface (the part of the exterior other than the base 312) is a curved, non-planar surface. A set of points 316 are defined for 3D object 310. Each of the points 316 are on the outer surface of the half-sphere.

The polygon mesh 320 (FIG. 3B) may be a planarization and a tessellation of the 3D object 310. That is, the polygon mesh 320 may be formed from a plurality of planar polygon faces 322 having a shared edge (or line segment 324) with another of the planar polygon faces 322. The points 326 of the polygon mesh may correspond to equivalent positions points on the surface of the 3D object.

Figure 3C:
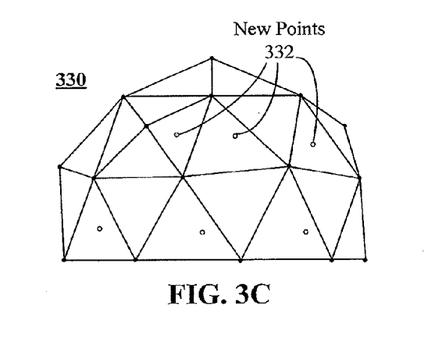

Diagram 330 of FIG. 3C shows an addition of a set of new points 332 to the polygon mesh 320. Each of the new points 332 may be ones on the curved surface of the 3D object 310. None of the new points 332 are initially located in any of the polygon faces of the polygon mesh. This lack may cause the polygon mesh to be adjusted from an initial state (polygon mesh 320) to a modified state (polygon mesh 360 as shown by FIG. 3F) to ensure all points become vertices of a polygon face. It should be emphasized that all of the original points 326 of the polygon mesh 320 may be retained for the modified polynomial 360, and that none of these originals points 326 are repositioned in a relative Euclidean space.

It should also be emphasized that traditional adjustment mechanisms, as mentioned in the background, shift a position of one or more of the original points 326 when forming a modified polygon mesh, which may result in a plane boundary mismatch. Cracks, distortions, or boundary mismatches may decrease in occurrence or be eliminated in their entirety with the disclosed adjustments, as none of the original vertices are shifted.

Figure 3D:
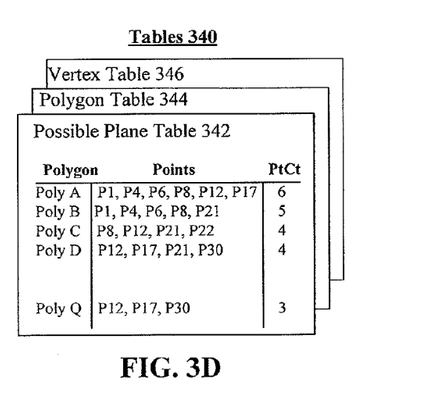

A set of tables 340 of FIG. 3D may be used, which include a vertex table 346, a polygon mesh table 344, and a candidate (possible) plane table 342. These tables 340 are used to establish a new set of planar polygon faces having the vertices (or points) 316 (shown by FIG. 3A) and 332. As shown, the candidate plane table 342 has been ordered by decreasing point count. In other embodiments, an area per polygon face may be used, and the ordering may be by decreasing area. Other ordering criteria for the candidate planes are contemplated (as discussed for step 225, for example). Use of point count has been selected here for ease of visual accuracy and expression.

Thus, when selecting planes from table 342 to build the modified polygon mesh 360, the first selected polygon (Poly A) has a point count of six, which is the greatest point count from table 342. This first planar polygon face is labeled as polygon face 354 in diagram 350 (shown by FIG. 3E) and modified polygon mesh 360. This polygon face 354 may be considered the reference plane for creating the modified polygon mesh 360. The selected polygon face 354 may be written to the polygon table 344.

Figure 3E:
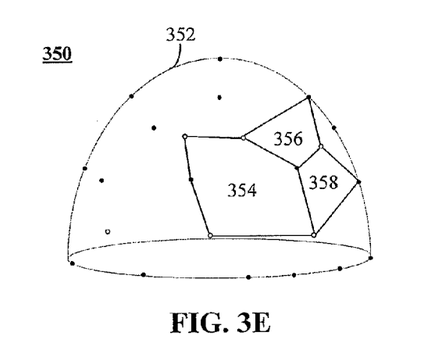
Figure 3F:
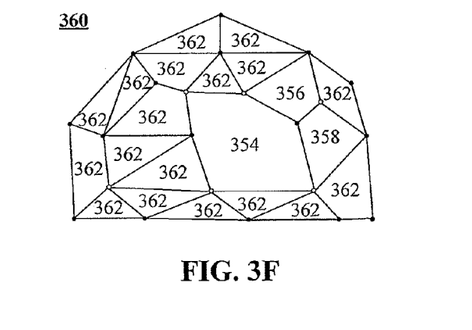

Once the reference plane is selected, the candidate plane table 342 may be filtered to exclude planes in the table that overlap with the selected polygon face 354. In this case, Poly B has points that overlap (cannot form a tessellation with an already selected polygon face) with Poly A. This may cause the candidate plane of Poly B to be excluded from consideration. The next ordered planes (Poly B and Poly C) from the candidate plane table 342 may be selected in order, which results in polygon faces 356 and 358 being added to diagram 350, which shows a partially formed state of the modified polygon mesh 360.

The process of selecting planes in order from the candidate plane table 342, adding selected planes to the polygon mesh table 344, and excluding candidate planes from table 342 (due to those planes overlapping with already selected polygon faces) may continue. This process may result in a continuous addition of polygon faces 362 to the modified polygon mesh 360, until each edge of each polygon face is shared with another polygon face. It should be appreciated that the vertex table 346, which includes points 326 and 332 is not changed throughout the process where candidate planes are generated and polygon faces are established. That is, no coordinates are shifted from any of the points in the vertex table 346 during the described use case.

FIGS. 4A-F are provided to further illustrate graphical modeling techniques for establishing a planar polygon mesh without adjusting vertices in accordance with embodiments. Specifically, graphic processing operations may occur in parallel. The disclosed solution may allow subdividing at multiple levels and handling in parallel, which may be a substantial boon for graphics processing.

Figure 4A:
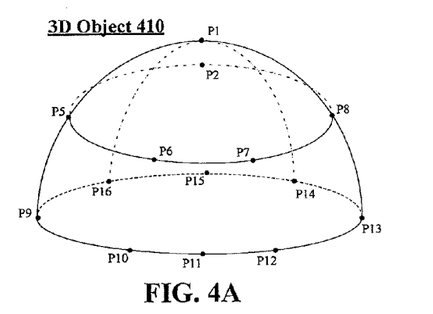
FIGS. 4A-4F illustrate graphical modeling techniques for establishing a planar polygon mesh without adjusting vertices in accordance with an embodiment of the disclosure.
Figure 4B:
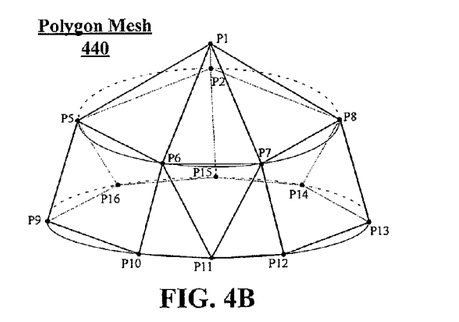
Figure 4C:
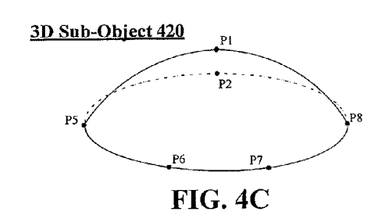

FIG. 4A expresses a 3D object 410, which is approximated by polygon mesh 440 of FIG. 4B. Both the 3D object 410 and the polygon mesh 440 have the same points, which are labeled P1, P2, P5, P6, P7, P8, P9, P10, P11, P12, P13, P14, P15, and P16. These points are positioned on the outer surface of the 3D object 410 and are vertices of planar polygons of the polygon mesh 440.

A set of unique coordinates in three dimensions exist for each of these points (P1-P16), which is shown by Table A below.

TABLE A

| Point | Coordinates |
|---|---|
| P1 | $X_1, Y_1, Z_1$ |
| P2 | $X_2, Y_2, Z_2$ |
| P6 | $X_6, Y_6, Z_6$ |
| P7 | $X_7, Y_7, Z_7$ |
| P8 | $X_8, Y_8, Z_8$ |
| P9 | $X_9, Y_9, Z_9$ |
| P10 | $X_{10}, Y_{10}, Z_{10}$ |
| P11 | $X_{11}, Y_{11}, Z_{11}$ |
| P12 | $X_{12}, Y_{12}, Z_{12}$ |
| P13 | $X_{13}, Y_{13}, Z_{13}$ |
| P14 | $X_{14}, Y_{14}, Z_{14}$ |
| P15 | $X_{15}, Y_{15}, Z_{15}$ |
| P16 | $X_{16}, Y_{16}, Z_{16}$ |

Appreciably, the actual values for the points in space can vary, so variables $X_1$-$X_{16}$ are shown for the X coordinate value of the points; $Y_1$-$Y_{16}$ are shown for the Y coordinate value of the points; and, $Z_1$-$Z_{16}$ are shown for the Z coordinate value of the points, respectively.

Figure 4D:
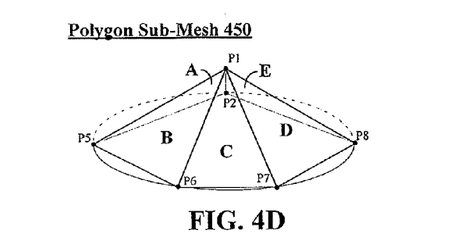
Figure 4E:
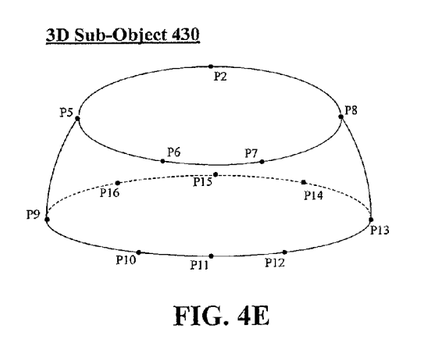
Figure 4F:
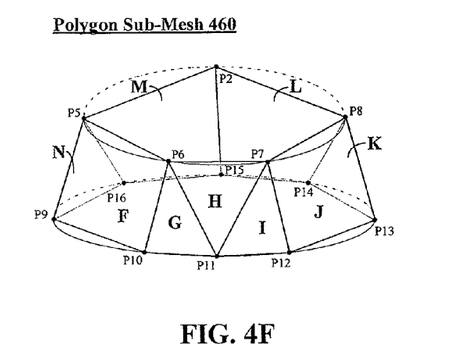

For processing efficiencies relating to parallelism, the 3D object 410, and the polygon mesh 440 may be divided into smaller segments, which are referred to herein as sub-objects and sub-meshes. As shown, 3D object 410 is divided into 3D sub-object 420 (FIG. 4C) and 3D subject 430 (FIG. 4E). Polygon mesh 440 may be divided into polygon sub-mesh 450 (FIG. 4D) and polygon sub-mesh 460 (FIG. 4F). Sub-object 420 may be approximated by sub-mesh 450. Sub-object 430 may be approximated by sub-mesh 460.

Sub-mesh 450 may be processed independent of sub-mess 460. Thus, no consideration needs to be given to (and no processing cycles expended for) interior planes. For sub-mesh 450 and 460, a plane formed from P2, P5, P6, P7 and P8 may be considered an interior plane. This plane (with vertices: P2, P5, P6, P7 and P8) may be the plane used to divide the sub-objects 420, 430 and sub-meshes 450, 460.

After division, two independent (and parallel) executions of method 200 may be conducted by the same or different processors. The results of the two may be merged, which may provide results for the polygon mesh 440. Appreciably, the division plane selected for subdividing polygon mesh 440 (and 3D object 410) may affect the end-results. This affect, however, may not result in cracks or other such distortions, as the joining points between the two independently processed sub-meshes (450 and 460) are identical, and no repositioning of the points of Table A has occurred.

Hence, a candidate plane table can be constructed from sub-mesh 450, which may be processed to produce polygon sub-mesh table, an example of which is shown below as Table B.

TABLE B

| Polygon | Points | PtCt | Area |
|---|---|---|---|
| Poly A | P1, P2, P5 | 3 | A1 |
| Poly B | P1, P5, P6 | 3 | A2 |
| Poly C | P1, P6, P7 | 3 | A3 |
| Poly D | P1, P7, P8 | 3 | A4 |
| Poly E | P1, P8, P2 | 3 | A5 |

Then, polygon faces may be selected in order from the candidate plane table, until the polygon sub-mesh table (Table B) results. As shown, polygon faces A, B, C, D, and E may result for sub-mesh 450.

In parallel to the creation of sub-mesh table (Table B), a candidate plane table may be created and ordered for sub-mesh 460. Polygon faces may be selected in order from the candidate plane table, until polygon sub-mesh table results, as shown by Table C below.

TABLE C

| Polygon | Points | PtCt | Area |
|---|---|---|---|
| Poly F | P5, P6, P10, P9 | 4 | A6 |
| Poly G | P6, P11, P10 | 3 | A7 |
| Poly H | P6, P7, P11 | 3 | A8 |
| Poly I | P7, P12, P11 | 3 | A9 |
| Poly J | P7, P8, P13, P12 | 4 | A10 |
| Poly K | P8, P14, P13 | 3 | A11 |
| Poly L | P8, P2, P15, P14 | 4 | A12 |
| Poly M | P2, P5, P16, P15 | 4 | A13 |
| Poly N | P5, P9, P16 | 3 | A14 |

As shown, polygon faces F, G, H, I, J, K, L, M, and N may result for sub-mesh 460.

A representation of polygon mesh 440 may be formed by combining results of sub-mesh 450 and results of sub-mesh 460. Thus, table records for Tables B and Table C may be combined to create records of a polygon mesh table, such as Table D shown below.

TABLE D

| Polygon | Points | PtCt | Area |
| --- | --- | --- | --- |
| Poly A | P1, P2, P5 | 3 | A1 |
| Poly B | P1, P5, P6 | 3 | A2 |
| Poly C | P1, P6, P7 | 3 | A3 |
| Poly D | P1, P7, P8 | 3 | A4 |
| Poly E | P1, P8, P2 | 3 | A5 |
| Poly F | P5, P6, P10, P9 | 4 | A6 |
| Poly G | P6, P11, P10 | 3 | A7 |
| Poly H | P6, P7, P11 | 3 | A8 |
| Poly I | P7, P12, P11 | 3 | A9 |
| Poly J | P7, P8, P13, P12 | 4 | A10 |
| Poly K | P8, P14, P13 | 3 | A11 |
| Poly L | P8, P2, P15, P14 | 4 | A12 |
| Poly M | P2, P5, P16, P15 | 4 | A13 |
| Poly N | P5, P9, P16 | 3 | A14 |

Table D can correspond to polygon mesh 440.

An ability to sub-divide processing for a complicated polygon mesh (unlike the simple one shown in FIGS. 4 and 5) may be critical in some applications. For example, polygon meshes may be used in real-time gaming, in real-world simulation, and in augmented reality situations. Reductions of complex "raw" input may have to be done dynamically even through processing time may be constrained.

For example, a polygon mesh to be rendered on a computing device (e.g., computing system 110) may include a non-planar polygon, even though a graphics controller (e.g., graphics controller 127) or a graphics library (e.g., library 134) routine cannot handle non-planar polygons. One solution to overcome this problem is to execute method 200 (or the equivalent) to generate a modified polygon mesh consisting of planar polygons, which the graphics controller and/or graphics library may handle. Time constraints on this conversion (for acceptable level of latency) may require the conversion be subdivided, where a different core of a multicore processor (e.g., processor 122) independently handles the processing for a polygon sub-mesh, which are combined to form the modified polygon mesh.

The flowchart and block diagrams in the FIGS. 1-4 illustrate the architecture, functionality, and operation of implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated, any use of the terms first, second, etc., does not denote any order or importance, but rather the terms first, second, etc., are used to distinguish one element from another.

What is claimed is:

1. A method comprising:
   determining, by at least one processor, a set of points that are vertices of an initial polygon mesh, said initial polygon mesh being formed from a plurality of triangles, each of the set of points being a vertex of a triangle of the plurality of triangles;
   generating, by the at least one processor, a plurality of candidate planes, each vertex of each of the plurality of candidate planes being a point of the set of points;
   ordering, by the at least one processor, the plurality of candidate planes by decreasing area, by decreasing line segment count, or by decreasing point count;
   selecting, by the at least one processor, one or more candidate planes as polygon faces in accordance with the ordering; and
   creating, by the at least one processor, a three-dimensional tessellation as a modified polygon mesh.

2. The method of claim 1, wherein the initial polygon mesh comprises at least one non-planar polygon face, and wherein the modified polygon mesh consists of planar polygon faces.

3. The method of claim 1, wherein the modified polygon mesh has fewer polygon faces than the initial polygon mesh.

4. The method of claim 1, wherein coordinate positions established in a Euclidean space for the set of points are unchanged for the modified polygon mesh in relation to the initial polygon mesh.

5. The method of claim 1, wherein the ordering of the plurality of candidate planes is by decreasing area.

6. The method of claim 1, wherein the ordering of the plurality of candidate planes is by decreasing line segment count.

7. The method of claim 1, wherein the ordering of the plurality of candidate planes is by decreasing point count.

8. The method of claim 1, wherein each of the selected candidate planes is a planar polygon face of the modified polygon mesh.

9. The method of claim 1, further compressing;
   excluding, by the at least one processor, non-selected ones of the one or more candidate planes that are unable to form a tessellation for the modified polygon mesh given the planar polygon faces already selected.

10. The method of claim 9, further comprising:
    repeating, by the at least one processor, the selecting and the excluding until the modified polygon mesh is formed as the three-dimensional tessellation.

11. The method of claim 1, wherein coordinate positions established in a Euclidean space for the set of points are unchanged for the modified polygon mesh in relation to the initial polygon mesh.

12. The method of claim 1, wherein the modified polygon mesh is a convex polyhedron having the set of points as vertices.

13. The method of claim 1, wherein the initial polygon mesh and the modified polygon mesh are irregular grids having four or greater dimensions.

14. The method of claim 1, further comprising:
    adding, by the at least one processor, one or more points to the set of points before determining the plurality of candidate planes, wherein each of the one or more points added to the set of points is positioned on a surface of a three dimensional object, wherein the initial polygon mesh is an approximation of the three dimensional object, wherein each of the one or more added points are a vertex of the modified polygon mesh.

15. The method of claim 1, further comprising;
removing, by the at least one processor, one or more points from the set of points before determining the plurality of candidate planes, wherein the initial polygon mesh has a greater number of vertices than the modified polygon mesh.

16. A computer program product for forming planar polygon meshes, the computer program product comprising:
at least one computer-readable, tangible storage device;
program instructions, stored on the at least one storage device, to determine a set of points that are vertices of an initial polygon mesh, said initial polygon mesh being formed from a plurality of triangles, each of the set of points being a vertex of a triangle of the plurality of triangles;
program instructions, stored on the at least one storage device, to generate a plurality of candidate planes, each vertex of each candidate plane of the plurality of candidate planes being a point of the set of points;
program instructions, stored on the at least one storage device, to order the plurality of candidate planes by decreasing area, by decreasing line segment count, or by decreasing point count;
program instructions, stored on the at least one storage devices, to select one or more of the candidate planes as polygon faces in accordance with the ordering; and
program instructions, stored on the at least one storage device, to create a three-dimensional tessellation as a modified polygon mesh.

17. The computer program product of claim 16, wherein the program instructions to order the plurality of candidate planes orders the plurality of candidate planes by decreasing area.

18. The computer program product of claim 16, wherein the program instructions to order the plurality of candidate planes orders the plurality of candidate planes by decreasing line segment count.

19. The computer program product of claim 16, wherein the program instructions to order the plurality of candidate planes orders the plurality of candidate planes by decreasing point count.

20. A system for forming planar polygon meshes, the system comprising:
at least one processor and at least one computer-readable, tangible storage device;
program instructions, stored on the at least one storage device for execution by the at least one processor, to determine a set of points that are vertices of an initial polygon mesh, said initial polygon mesh being formed from a plurality of triangles, each of the set of points being a vertex of a triangle of the plurality of triangles;
program instructions, stored on the at least one storage device for execution by the at least one processor, to generate a plurality of candidate planes, each vertex of each of the plurality of candidate planes being a point of the set of points;
program instructions, stored on the at least one storage device for execution by the at least one processor, to order the plurality of candidate planes by decreasing area, by decreasing line segment count, or by decreasing point count;
program instructions, stored on the at least one storage device for execution by the at least one processor, to select one or more candidate planes as polygon faces in accordance with the ordering; and
program instructions, stored on the at least one storage device for execution by the at least one processor, to create a three-dimensional tessellation as a modified polygon mesh.

\* \* \* \* \*